(12) United States Patent
Leshchiner et al.

(10) Patent No.: US 8,898,399 B2
(45) Date of Patent: Nov. 25, 2014

(54) LOCKING AND SIGNALING FOR IMPLEMENTING MESSAGING TRANSPORTS WITH SHARED MEMORY

(75) Inventors: Dan Leshchiner, Palo Alto, CA (US); Balbhim Mahurkar, Palo Alto, CA (US)

(73) Assignee: TIBCO Software Inc., Palo Alto, CA (US)

(*) Notice: Subject to any disclaimer, the term of this patent is extended or adjusted under 35 U.S.C. 154(b) by 0 days.

(21) Appl. No.: 13/298,237

(22) Filed: Nov. 16, 2011

(65) Prior Publication Data

US 2012/0131285 A1 May 24, 2012

Related U.S. Application Data

(60) Provisional application No. 61/414,331, filed on Nov. 16, 2010.

(51) Int. Cl.
*G06F 12/00* (2006.01)
*G06F 9/52* (2006.01)
*G06F 9/54* (2006.01)

(52) U.S. Cl.
CPC . *G06F 9/52* (2013.01); *G06F 9/544* (2013.01)
USPC ........... 711/153; 709/213; 711/110; 711/156; 711/173

(58) Field of Classification Search
USPC .................. 709/213; 711/110, 153, 156, 173
See application file for complete search history.

(56) References Cited

U.S. PATENT DOCUMENTS

| | | | |
|---|---|---|---|
| 6,092,155 A | 7/2000 | Olnowich | |
| 6,148,375 A | 11/2000 | Baylor et al. | |
| 6,553,466 B1 | 4/2003 | Friedman et al. | |
| 2002/0039350 A1 | 4/2002 | Wang et al. | |
| 2002/0078132 A1* | 6/2002 | Cullen et al. | 709/201 |
| 2003/0105917 A1* | 6/2003 | Ostler et al. | 711/110 |
| 2005/0028039 A1* | 2/2005 | Henderson et al. | 714/42 |
| 2008/0104152 A1* | 5/2008 | Stephens et al. | 707/206 |
| 2008/0209153 A1* | 8/2008 | Schneider | 711/170 |
| 2010/0217916 A1* | 8/2010 | Gao et al. | 711/6 |

OTHER PUBLICATIONS

PCT/US2011/061066, International Search Report and Written Opinion of the International Searching Authority mailed Jul. 31, 2012.

* cited by examiner

*Primary Examiner* — Gurtej Bansal
(74) *Attorney, Agent, or Firm* — Baker & McKenzie LLP (57) ABSTRACT

Disclosed are systems and methods for transporting data using shared memory comprising allocating, by one of a plurality of sender application, one or more pages, wherein the one or more pages are stored in a shared memory, wherein the shared memory is partitioned into one or more pages, and writing data, by the sender application, to the allocated one or more pages, wherein a page is either available for use or allocated to the sender applications, wherein the one or more pages become available after the sender application has completed writing the data. The systems and methods further disclose sending a signal, by the sender application, to a receiver application, wherein the signal notifies the receiver application that writing the data to a particular page is complete, reading, by the receiver application, the data from the one or more pages, and de-allocating, by the receiver application, the one or more pages.

22 Claims, 6 Drawing Sheets

FIG. 15
```
read data as indicated by the page's Byte Count
if (Global Write Page == Current Read Page)
    /* sender still has this page open for writing */
    pause reading
else
{
    /* sender has moved on; advance receiver to next page */
    lock next page
    unlock current page
    advance Current Read Page
}
```

FIG. 16A
```
while (Available Count > Page Size)
{
    Read Page Size bytes from page
    Available Count = Available Count - Page Size
    Deallocate page and continue to next page
}
```

FIG. 16B
```
If (LastPage.next.next == LastPage)
    Deallocate LastPage.next
    Deallocate LastPage
else
    Deallocate LastPage
```

FIG. 17
```
sender2.next = sender1
header.next = sender 2
```

FIG. 18
```
receiver1 reads 1010000
receiver3 reads 1010000
receiver1 writes 0010000
receiver3 writes 1000000
```

LOCKING AND SIGNALING FOR
IMPLEMENTING MESSAGING
TRANSPORTS WITH SHARED MEMORY

CROSS REFERENCE TO RELATED
APPLICATIONS

This application relates and claims priority to U.S. Provisional Patent Application No. 61/414,331 entitled "Locking and signaling for implementing messaging transports with shared memory," filed on Nov. 16, 2010, which is hereby incorporated by reference in its entirety.

TECHNICAL FIELD

The disclosed embodiments relate generally to data transports through the use of shared memory and, more specifically, relate to substantially lossless allocation of pages of the shared memory of messaging for many senders to one receiver and proactive flow control of the shared memory of messaging for one sender to many receivers.

BACKGROUND

Typical servers and communication systems do not use shared memory for many different applications or processes. Shared memory is typically used with one application writing to memory segments and another application reading the memory segments. The need has arisen to provide a method and system for using shared memory to implement highly efficient data transports in both the scenario of many senders to one receiver and one sender to many receivers.

SUMMARY

Disclosed are systems and methods for transporting data using shared memory comprising allocating, by one of a plurality of sender application, one or more pages, wherein the one or more pages are stored in a shared memory, wherein the shared memory is partitioned into one or more pages, and writing data, by the sender application, to the allocated one or more pages, wherein a page is either available for use or allocated to the sender applications, wherein the one or more pages become available after the sender application has completed writing the data. The systems and methods further disclose sending a signal, by the sender application, to a receiver application, wherein the signal notifies the receiver application that writing the data to a particular page is complete, reading, by the receiver application, the data from the one or more pages, and de-allocating, by the receiver application, the one or more pages. Senders and receivers residing on a single host can implement highly efficient data transports through the use of shared memory. Disclosed also are systems and methods for flow control for many receiver applications and one sender application using shared memory in a multicast scenario.

DETAILED DESCRIPTION

Figure 1:
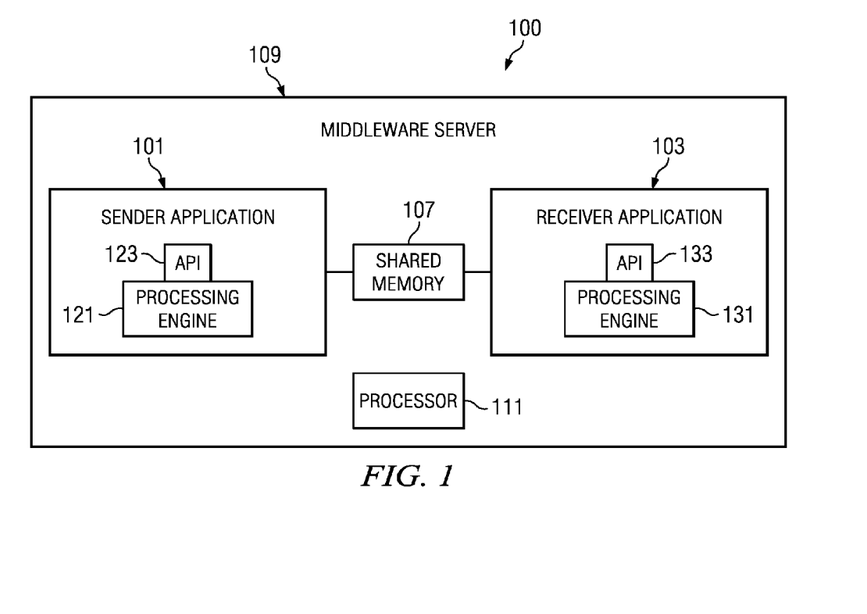
FIG. 1 is a schematic diagram of an example system for data transports on a single host machine through the use of shared memory, in accordance with the present disclosure.

FIG. 1 is a schematic diagram of a system 100 for data transports between a sender application 101 and a receiver application 103 through the use of shared memory 107. System 100 may include a middleware server 109 or a host machine 109 that may include sender application 101, shared memory 107, receiver application 103, and a processor 111. Assuming that the sender application 101 and the receiver application 103 reside on the same middleware server 109 or host machine 109, the sender application 101 and the receiver application 103 may send messages through the use of the shared memory element 107. The sender application 101 and the receiver application 103 may run messaging applications including sender-side processing engine 121 and receiver-side processing engine 131. The sender application 101 and the receiver application 103 also include any application programming interfaces ("APIs") 123, 133 used for interacting with other elements of FIG. 1. The sender application 101 and the receiver application 103 are in communication with each through shared memory 107.

In an embodiment, the host machine 109 provides a shared memory engine (not shown). A host machine processor 111 may execute the shared memory engine's routines and the shared memory element 107 may store and provide data structures, variable values, etc. as the shared memory engine operates. The shared memory engine is operable to assist the sender application 101 and the receiver application 103 in utilizing shared memory 107 for data transports. Thus, the shared memory 107 may be operable to assist the sender application 101 and the receiver application 103 with partitioning shared memory, page allocation and de-allocation, page locking and unlocking, writing data to a page, signaling each other, determining whether space is available in the shared memory 107, performing fault and failure prevention schemes, determining receiver interest, etc.

In another embodiment, sender application 101 and receiver application 103 provide routines and some processing to utilize shared memory 109 for data transports. Thus, the applications 101, 103 may also be operable to partition shared memory, allocate and de-allocate pages, lock and unlock pages, write data to a page, signal each other, determine whether space is available in the shared memory 107, perform fault and failure prevention schemes, determine receiver interest, interact host machine 109, etc.

In the disclosed embodiments, sender application 101 may write data to memory segments (at shared memory 107) that are shared with receiver applications 103 and signal the receiver applications 103 when a write is complete. Receiver applications 103, in turn, read data from these shared memory 107 segments when they are signaled.

The patterns of sender applications 101 and receiver applications 103 relevant to this invention can be broken down into two general cases. A first includes many sender applications 101 and one receiver application 103 (i.e., "many-to-one"). A second case includes one sender application 101 and many receiver applications 103 (i.e., "one-to-many"). In some embodiments, sender application 101 may write data to memory segments in shared memory 107 that are shared with receiver applications 103, and receiver applications 103 may read data from these shared memory segments in shared memory 107 when the receiver applications 103 are signaled by the sender application 101.

While illustrated as a single sender machine 101 in FIG. 1, system 100 may comprise more than one sender application 101. Although described as sender application 101 in FIG. 1, sender application 101 may receive messages and/or read data from shared memory 107 in some embodiments. While illustrated as a single receiver application 103 in FIG. 1, system 100 may comprise more than one receiver application 103. Although described as receiver application 103 in FIG. 1, receiver application 103 may send messages and write data to shared memory 107 in some embodiments.

System 100 may comprise middleware server 109, which may be any suitable computing device comprising a processor and a memory to perform the described functionality. Middleware server 109 may comprise one or more machines, workstations, laptops, blade servers, server farms, and/or stand-alone servers. Middleware server 109 may include any hardware and/or controlling logic used to communicate information to and from one or more elements illustrated in FIG. 1. For example, middleware server 109 may be operable to receive and process data of different types that may be transmitted via different protocols or formats. Other elements in FIG. 1 may also comprise hardware and/or controlling logic to communicate information to and from one or more elements illustrated in FIG. 1. Shared memory 107 may store any suitable information. Shared memory 107 may comprise any collection and arrangement of volatile and/or non-volatile components suitable for storing data. For example, shared memory 107 may comprise random access memory (RAM) devices. In particular embodiments, shared memory 107 may represent, in part, computer-readable storage media on which computer instructions and/or logic are encoded. Shared memory 107 may represent any number of memory components within, local to, and/or accessible by processor. Processor 111 may represent and/or include any form of processing component, including general purpose computers, dedicated microprocessors, or other processing devices capable of processing electronic information. Examples of processor 111 include digital signal processors (DSPs), application-specific integrated circuits (ASICs), field-programmable gate arrays (FPGAs), and any other suitable specific or general purpose processors.

Figure 2:
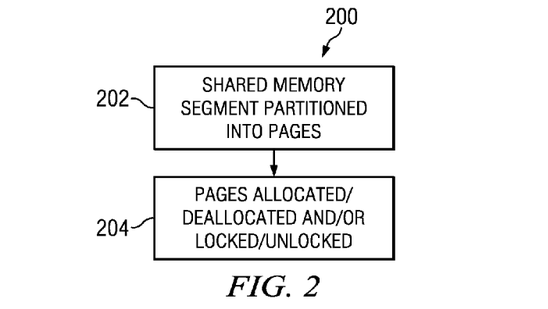
FIG. 2 is a high-level flow diagram illustrating a process for data transports through the use of shared memory, in accordance with the present disclosure.

FIG. 2 is a high-level flow diagram 200 illustrating a process for data transport through the use of shared memory for both many-to-one and one-to-many cases. In both cases, a shared memory segment is partitioned into pages at action 202, and the pages are allocated/de-allocated or locked/unlocked as needed at action 204.

Lossless Allocation of Panes for Many-to-One Messaging

Figure 3:
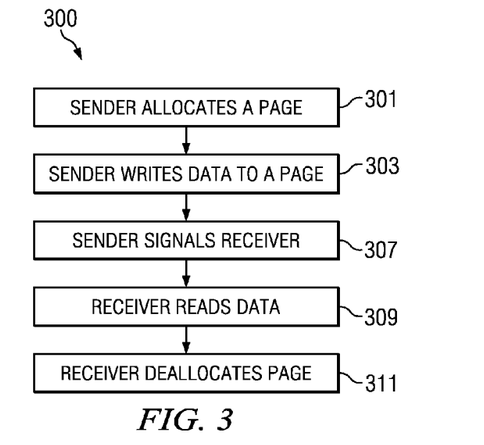
FIG. 3 is a flow diagram illustrating a process for many-to-one messaging, in accordance with the present disclosure.

FIG. 3 is a flow diagram illustrating a process 300 for many-to-one messaging. In the case of many senders and one receiver, pages are drawn from shared memory and assigned on a per-sender basis. In its simplest form, the process 300 includes a sender allocating a page at action 301, a sender writing data to the allocated page at action 303, and a sender signaling a receiver at action 307. An exemplary method used by senders to signal a receiver in the context of shared-memory message passing is discussed below in relation to FIGS. 10A and 10B. The process 300 may further include a receiver reading the data at action 309 and the receiver de-allocating the page at action 311. Thus, in an embodiment, the senders perform page allocation at action 301 and the receiver handles the de-allocation at action 311. These steps may be done in conjunction with a shared memory engine in a host machine having the shared memory.

This process 300 also allows for senders to allocate multiple pages at action 301 when their data cannot fit into a single page. Senders may also make multiple writes at action 303 over time, signaling the receiver at action 307 after each write is completed.

In an embodiment, the process 300 is executed such that pages are allocated and de-allocated in a substantially lossless fashion when the following conditions are met: (1) a page is either on the free list or allocated to one sender at a time, and (2) pages are returned to the free list upon completion of their use. In an embodiment, these conditions may be met whether or not the sending process exits naturally or unexpectedly and without the need for an expensive "garbage collection" process to periodically scan the shared memory. In some embodiments, it is assumed that a receiver process is substantially faultless, or, should it exit unexpectedly, the entire shared memory segment is de-allocated. Thus, in these embodiments, the processes are resilient to sender faults.

Figure 4:
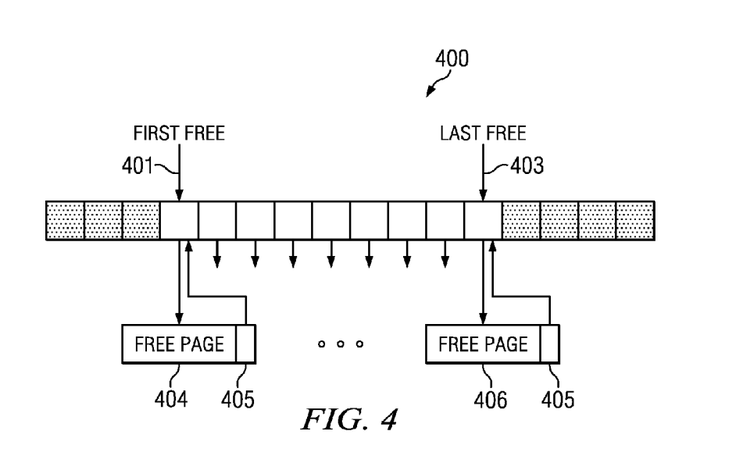
FIG. 4 is a schematic diagram illustrating an example data structure for a circular free list, in accordance with the present disclosure.

FIG. 4 is a schematic diagram 400 illustrating a data structure for a free list 400. In an embodiment, the free list is a circular buffer containing pointers to free page 404, free page 406, and each of the plurality of the free pages depicted between those free pages in a shared memory segment. Pointers first free 401 and last free 403 point to positions in the circular buffer that have links to the first and last free pages, respectively. Pointer first free 401 is a global variable accessible by both senders and the receiver. In an embodiment, a shared memory engine in the host machine may provide the pointer first free 401 upon request from a sender or a receiver. Pointer last free 403 is a local variable accessible by the receiver.

Because the shared memory segment may be located at a different virtual memory address in each of the mounting processes, pointer first free 401 and pointer last free 403 are offsets into an array rather than virtual memory addresses. Further, the system may keep track of each iteration that pointer first free 401 makes through the circular buffer free list 400. Thus, the value of pointer first free 401 is a monotonically increasing integer whose raw value is taken modulo the length of the free list 400 to determine the actual offset.

As discussed above, the circular buffer free list 400 contains links to free pages, e.g., pages 404 and 406, in a shared memory segment. Each free page 404 and 406 includes a next field 405 pointing to a slot in the circular buffer free list 400 from which it is linked. The actual value used is the raw (un-modulo) value of pointer first free 401 when it will next point to the cell. In an example embodiment, if free list 400 has a size of 100 and the first free page value is 205, meaning that it points at slot 5 and this is the third time through this buffer (204 free pages have been consumed from the free list), then the second page on the free list would have next field having value of 206. This value of 206 would then be what the value of first free page would be when it is adjusted to point to slot 6 after the preceding page is removed from the list. Referring back to FIG. 4, by using the raw values, the system may detect a page that has been allocated and de-allocated, even if it falls into the same pointer first free 401 slot each time.

In addition to the global circular buffer free list 400, in an embodiment, each sender application may maintain a linked list of pages it has been allocated.

Figure 5:
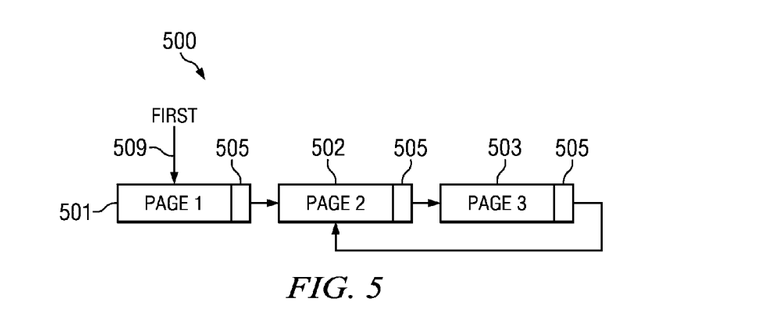
FIG. 5 is a schematic diagram illustrating an example of a sender's linked list of allocated pages, in accordance with the present disclosure.

FIG. 5 is a schematic diagram illustrating an exemplary sender's linked list 500 of allocated pages. The linked list 500 contains three pages 501, 502, 503. Each page 501 and 502, except for the last page 503, has a field 505 for pointing to the next page in the series in the linked list 500. Last page 503 has a field 505 pointing to the page that was last on that list at the time page 503 was added to this list, in this case page 502. A pointer first 509 points to the first page in the linked list 500. Each sender also keeps an available count variable (not shown) which tracks the number of bytes that have been written into the pages 501, 502, 503.

In an embodiment, senders add pages to the end of their linked lists 500, and a receiver de-allocates pages from the front of the senders' linked lists as it completes reading them and begins reading the next page. Allocation and de-allocation is discussed in further detail below.

Figure 6:
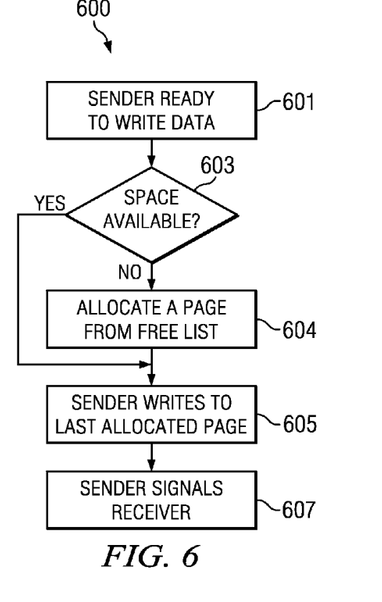
FIG. 6 is a flow diagram illustrating a process for page allocation, in accordance with the present disclosure.

FIG. 6 is a flow diagram illustrating a process 600 for page allocation. When a sender is ready to write data at action 601, the sender checks to see if there is space available in its last allocated page at decision 603. If there is sufficient space, the sender writes the data at action 605 and signals the receiver at action 607. If there is insufficient space, the sender allocates a page from a circular buffer free list and links the page into the sender's linked list. The sender writes data at action 605 and signals a receiver at action 607 as discussed above. In an embodiment, a shared memory engine in the host machine may assist with the steps 603, 605.

Failure at any step in the process 600 may disturb the system and, thus, processes are used to minimize the risk of failure at each step. Should a failure occur, the processes would leave the system in a consistent or recoverable state, such that a page is either left on (or returned to) a circular buffer free list or allocated to exactly one sender. Multiple senders may be simultaneously attempting to allocate a page from the circular buffer free list, and any one page should be allocated to one sender at a time.

To accomplish only allocating one page to one sender at a time, referring back to FIG. 5, the next field 505 of the sender's last page 503 in the sender's linked list 500 is set to point at the free page being allocated (not shown). Referring back to FIG. 6, the next field of the free page being allocated is set to point at the sender's last page in the sender's linked list. Then the pointer first free is advanced and the sender may write data into the page at action 605. The sender's available count is incremented and the receiver is signaled at action 607.

Multiple senders may attempt to allocate the same free page. This is resolved by using an atomic compare and swap instruction. As discussed above and referring back to FIG. 4, each free page 404, 406 has its next field 405 set to point logically back into the free list 400. As discussed, the pointer first free 401 is a monotonically increasing integer whose value is reduced modulo the length of the free list to create an offset into the list. The combination of these two techniques substantially prevents free pages from accidentally being allocated from the middle of the circular buffer free list 400. This may accidentally happen if a first sender reads the value of pointer first free 401 and then sleeps before completing a compare-and-swap process. A second sender may successfully allocate the page, write to it, and signal the receiver. The receiver may read the data and de-allocate the page, linking it to the end of the circular buffer free list 400. When the first sender wakes up it will find that the value in its free page's next field no longer matches the pointer first free 401 value it read before sleeping. Even if the de-allocated page happened to be linked from the same cell in the circular buffer free list, the monotonically increasing value of pointer first free 401 can distinguish between iterative uses of the same cell.

Using a compare-and-swap thus results in one sender at a time being able to set the free page's next field. This winning sender will know that it has been allocated the page, and losing senders will know that they failed and can then restart the allocation sequence.

The winning sender may also fail after the next field of the free page being allocated is set to point at the sender's last page in the sender's linked list. In this case the page has already been successfully allocated, but the pointer first free has not been advanced. This may be resolved by noting that pages on the circular buffer free list have next fields indicating whether or not they are free. If the next fields point to the free list, then they are free; if they point to another page, they are allocated, and therefore not free. Thus, any sender initiating the allocation sequence can check the free page that pointer first free points to and determine whether it has already been allocated. If the page has already been allocated, this sender may advance the pointer first free.

Figure 7:
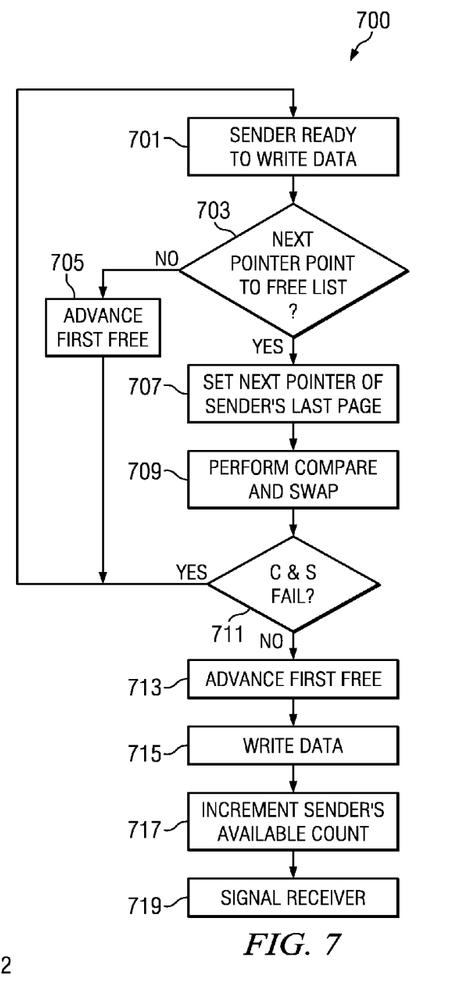
FIG. 7 is a flow diagram illustrating a process for page allocation and failure prevention, in accordance with the present disclosure.

FIG. 7 is a flow diagram illustrating a process 700 for page allocation including failure handling. At action 701, a sender determines whether it is ready to write data. The sender determines whether the next field of the page referred to by the pointer first free points back to the circular buffer free list at decision 703. If it does not, then the pointer first free is advanced by action 705 and the process starts over. If it does, then the next field of the sender's last page is set to point at the free page being allocated at action 707. A compare-and-swap process is performed at action 709 by running a compare-and-swap on the next field of the free page being allocated to point at the sender's last page. If the compare-and-swap fails at decision 711, then the sender starts over at action 701. If the compare-and-swap succeeds at decision 711, pointer first free is advanced at action 713, data is written into the page at action 715, a sender's available count is incremented at action 717, and the receiver is signaled at action 719.

Thus, pointer first free does not fail in the case that an allocating sender fails before completing action 713.

In an embodiment, a receiver may correctly reset a page's next field to point at the circular buffer free list before the page is returned to the circular buffer free list.

Actions 705 and 713 in process 700 advance pointer first free. Given that multiple senders may be executing this sequence in parallel, the process may also ensure that the pointer first free is not advanced multiple times when only one advance is called for. In particular, should a sender decide in action 705 that it should advance the pointer first free, it should ensure that another sender making the same decision in parallel has not already advanced the pointer. When a sender is ready to advance the pointer in action 713, it should ensure that another sender that is at action 705 has not advanced the pointer first. To accomplish this, the sender may use compare-and-swap so that it only advances the pointer first free when the value remains consistent from checking its value to updating its value. If the compare-and-swap fails while executing action 705, the sender repeats decision 703. Should the compare-and-swap fail while executing action 713, the sender continues without incrementing the pointer first free.

In an embodiment, before advancing pointer first free, the sender may determine whether the next page is free or not free. If not, the circular buffer free list is currently empty (that is, there are no free pages to be allocated), and the sender should leave pointer first free as-is. Should a page eventually be de-allocated by a receiver, the pointer first free will subsequently be advanced by the next sender attempting to allocate a page.

Because the free list is a circular buffer, it is possible pointer first free advances all the way through the list to its starting point. If pointer first free is a simple offset into the circular buffer free list, this circular advancement may go unnoticed, and a sender at action 705 or 713 might advance the pointer first free when it has already been advanced by others. As noted above, pointer first free is stored as a monotonically increasing integer for purposes of compare-and-swap, and its value is reduced modulo the length of the free list to create an offset into the circular buffer free list itself. This allows a sender to notice if pointer first free has changed between the time its value was recorded and the time the compare-and-swap is executed, even if pointer first free has circled the entire list.

Figure 9A:
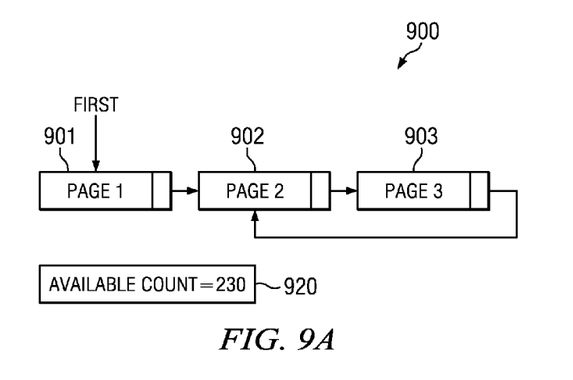
FIG. 9A is a schematic diagram illustrating an example of a sender's linked list of allocated pages, in accordance with the present disclosure.

As described above, each sender maintains a linked list of the pages that have been allocated for its use. FIG. 9A is a schematic diagram illustrating a sender's linked list 900 of allocated pages 901, 902, 903. A sender's linked list available count 920 specifies the number of bytes that are available for reading. In this case, assume each page holds 100 bytes and the available count 920 of 230 indicates that pages 1 and 2 are full, and that page 3 contains 30 bytes.

Figure 8:
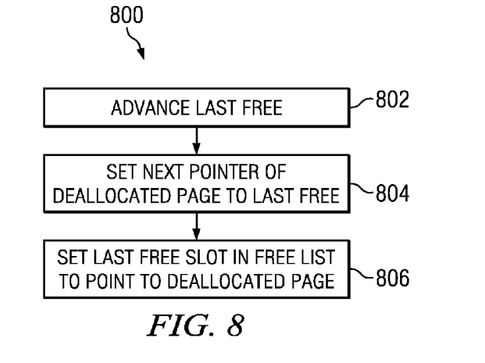
FIG. 8 is a flow diagram illustrating page de-allocation, in accordance with the present disclosure.

Each page is de-allocated as the receiver finishes reading its data, returning the page to the slot after the pointer last free on the circular buffer free list. FIG. 8 is a flow diagram illustrating a page de-allocation 800. The pointer last free is advanced at action 802, the next field of the de-allocated page is set to point to the pointer last free at action 804 (the pointer last free is also a monotonically increasing integer and is handled substantially identical to the first free pointer in that regard), and the last free slot in the circular buffer free list is set to point to the de-allocated page at action 806 (as discussed above, the raw value of the pointer last free is reduced modulo the length of the circular buffer free list to find the actual offset into the list).

Referring back to FIG. 9A, reading and de-allocating continues until the last page 903 is reached. The last page 903 is recognized via the available count 920 indicating that the written data does not stretch past the end of the page.

Figure 16A:
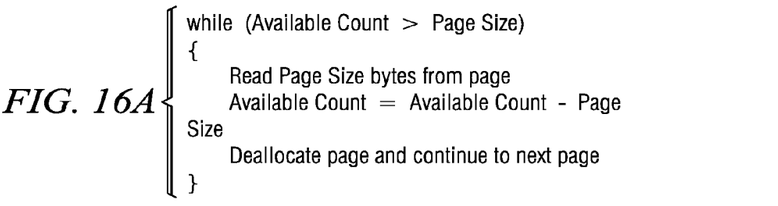
FIG. 16A is a schematic diagram of an exemplary routine for recognizing a last page in page de-allocation, in accordance with the present disclosure.

FIG. 16A is a schematic diagram of an exemplary routine for recognizing a last page in page de-allocation.

Referring back to FIG. 9A, the receiver may read the bytes on the last remaining page 903, keeping track of the number of bytes read so that an additional read, prompted by an additional write from the sender, will start at the appropriate offset into the page. Once the final page 903 is read, the receiver may leave the last page 903 in place if the sender is still active or may de-allocate the last page 903 if the sender has exited. In an embodiment, the receiver is notified out-of-band when a sender exits.

Regarding de-allocating the last page 903 if the sender has exited, in an embodiment in which the sender is known to have exited, the receiver handles situations in which the sender exited at various points in the allocation process. As discussed above in relation to FIG. 7, senders allocate pages in accordance with process 700.

At action 709, a page is considered allocated if the compare-and-swap is successful. And at action 717, the data on the page is considered live for receiver consumption. If the sender exits before completing action 709, the page is not considered allocated to this sender, and thus of no concern to the receiver in processing this sender's pages. If the sender exits after action 717 is completed, the page is considered allocated and the available count signals to the receiver that the remaining page is actually the last page. This page may be de-allocated. If the sender exits after completing action 709, but before completing action 717, then the page will be allocated to the sender, but the available count will not correctly signal this to the receiver.

Figure 9B:
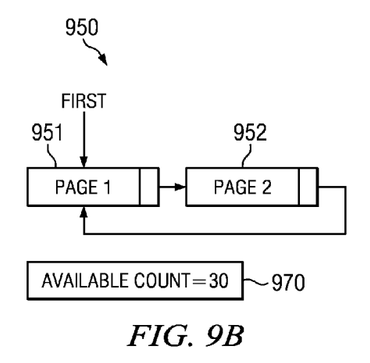
FIG. 9B is a schematic diagram illustrating an example of a faulty linked list of allocated pages, in accordance with the present disclosure.

FIG. 9B is a schematic diagram illustrating a linked list 950 with an incorrect available count. In an embodiment, if each page can hold 100 bytes, the available count of 30 indicates that a first page 951 is the last allocated page. Were the receiver to rely only upon the available count, it would de-allocate the first page 951 and leave the second page 952 orphaned. To address this issue, a receiver may perform extra logic when de-allocating exited sender's last page.

Figure 16B:
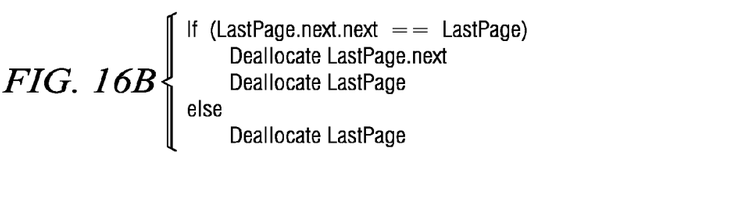
FIG. 16B is a schematic diagram of an exemplary routine for de-allocating a last page, in accordance with the present disclosure.

FIG. 16B is a schematic diagram of an exemplary routine for de-allocating a sender's last page.

Referring back to FIG. 7, if a sender failed after decision 711, then a page will have been allocated from the circular buffer free list, and this page will have been linked into the sender's list, as in FIG. 9B. If the sender failed before action 709 or after action 717, then no additional page needs to be de-allocated by receiver. In either case, the receiver correctly returns all of the sender's pages back to the circular buffer free list.

As discussed above, each sender notifies a receiver when it has successfully written additional data to its pages. The mechanism for notification might be implemented as an operating system socket, semaphore, or via polling of a sender's available count by the receiver. The former can be very expensive, particularly when there are a large number of senders; the latter uses careful balance between the polling period and the overhead it creates. Further, in implementing low-latency messaging, the signals should be received in-line for maximum performance.

Thus, an alternative is to create a linked list of nodes representing senders that have content (that is, a non-zero available count), and have each sender add itself to the list as it successfully writes data, using a similar compare-and-swap tie-breaking strategy to ensure the correctness of the list.

Figure 10A:
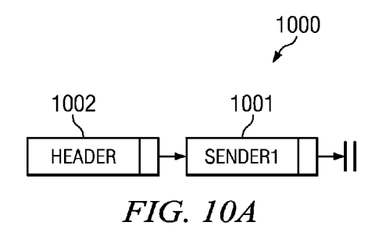
FIG. 10A is a schematic diagram illustrating an example of a linked list used for signaling a receiver, in accordance with the present disclosure.

FIG. 10A is a schematic diagram illustrating a linked list 1000 used for signaling a receiver. Linked list 1000 starts with a single sender 1001 ("Sender1") on the list 1000. A second sender may insert itself at the header 1002 of the list 1000.

Figure 17:
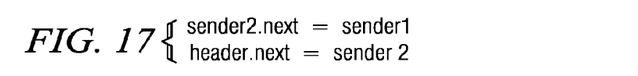
FIG. 17 is a schematic diagram of an exemplary routine for a sender inserting itself into a linked list, in accordance with the present disclosure.

FIG. 17 is a schematic diagram of an exemplary routine for a second sender inserting itself into a linked list. The next field of the second sender (sender2.next) is set to point to the first sender (sender2.next=sender1). The next field of the header (header.next) is set to point to the second sender (header.next=sender2).

Figure 10B:
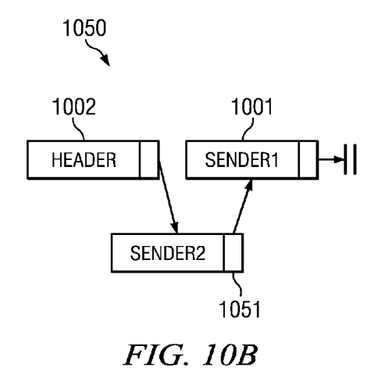
FIG. 10B is a schematic diagram illustrating another example of a linked list used for signaling a receiver, in accordance with the present disclosure.

FIG. 10B is a schematic diagram illustrating a resultant linked list 1050 after a second sender 1051 ("Sender2") inserts itself into the list 1000. A compare-and-swap operation may be used for the second assignment to ensure that only one sender modifies the next field of the header in the linked list (header.next). If the compare-and-swap fails, the sender may begin a new insertion attempt. The receiver continues to process senders in the list until the list is empty, at which point it may sleep.

Senders add themselves to the list when their writing of data causes them to increment their available count from zero to non-zero (when the available count is already >0, the sender is already represented on the list and the receiver will automatically read additional data). When a sender detects that it is inserting the first page in the linked lists 1000 and 1050 (i.e., by detecting that its page's next pointer is NIL), it may wake the receiver upon completion of the insertion.

Proactive Flow Control for One-to-Many Messaging

Figure 11:
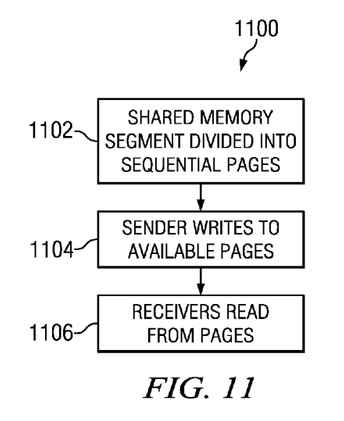
FIG. 11 is a high-level flow diagram illustrating a process for one-to-many messaging, in accordance with the present disclosure.

FIG. 11 is a high-level flow diagram illustrating a process 1100 for one-to-many messaging. For one-to-many messaging, a shared memory segment is broken into sequential pages at action 1102, a sender writes into the pages at action 1104, and the receivers read from the pages at action 1106. Receivers may signal to the sender, via an out-of-band channel, their interest in the sender's data. The sender tracks each receiver until the receiver signals an end to its interest, or until the receiver's exit is detected.

The methods and systems disclosed herein implement sender-based flow control. In an embodiment, should the shared memory segment become full (that is, contain data in each page that has not been read by every registered receiver), the sender is paused until memory becomes available so that the sender does not write over data being read by a receiver. The methods and systems correctly survive receiver failures. In an embodiment, in the case of a sender failure, the shared memory segment is scrapped. The methods and systems disclosed herein are implemented without use of in- or out-of-band ACKs or NACKs, or a separate communication backchannel.

Figure 12:
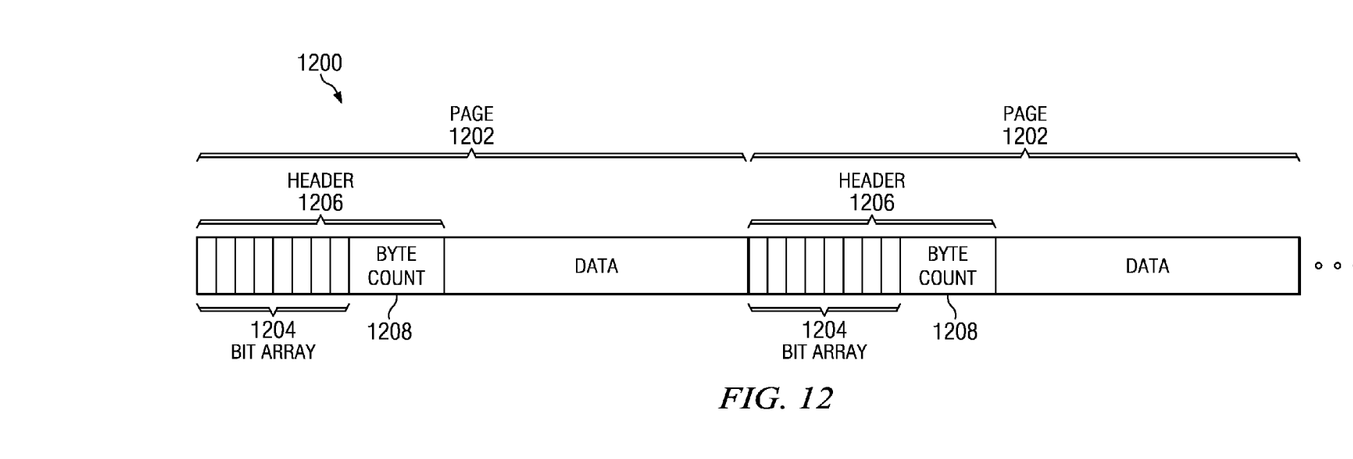
FIG. 12 is a schematic diagram illustrating an example data structure for a shared memory segment, in accordance with the present disclosure.

FIG. 12 is a schematic diagram illustrating a data structure for a shared memory segment 1200. The shared memory segment is divided into pages 1202, and each page 1202 includes a header 1206. The header 1206 includes a bit array 1204 in which the bits represent registered receivers and a byte count 1208 representing a number of bytes that have been written into the page 1202. The pages 1202 are written in a circular fashion, and, the sender pauses when it detects that the next page to be written has at least one registered receiver that has not yet completed its read.

A global variable, e.g., global write page, tracks the current page to which the sender is writing. The value of global variable may be stored in the host machine and is accessible to both the sender and receivers. An array of values (e.g., current read page array) tracks pages that the receivers are currently reading.

In an embodiment, receivers explicitly signal their interest to the sender through a receiver registration process. The sender assigns the receiver an ID that correlates to a specific bit position in the bit arrays. In an embodiment, a receiver is assigned the lowest order bit that is currently unassigned.

Figure 13:
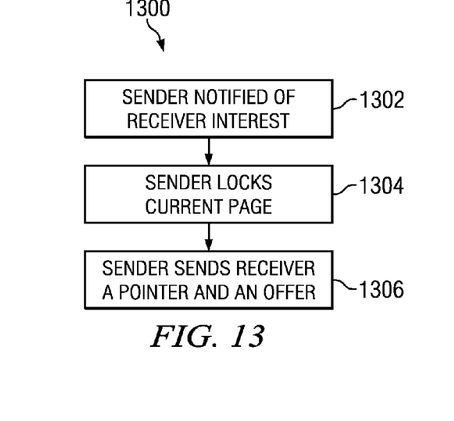
FIG. 13 is a flow diagram illustrating receiver registration, in accordance with the present disclosure.

FIG. 13 is a flow diagram illustrating a process 1300 for receiver registration. The sender is notified of a receiver's interest at action 1302 and locks the page it is currently writing at action 1304 by setting that receiver's bit in the current page's bit array. The sender then sends the receiver a pointer to the current page and an offset into the page's data at action 1306, to indicate where the receiver should begin reading. Thus, the sender locks a page on behalf of a receiver when the receiver's initial interest is processed. As shown below, receivers are responsible for locking subsequent pages for themselves.

Figure 14:
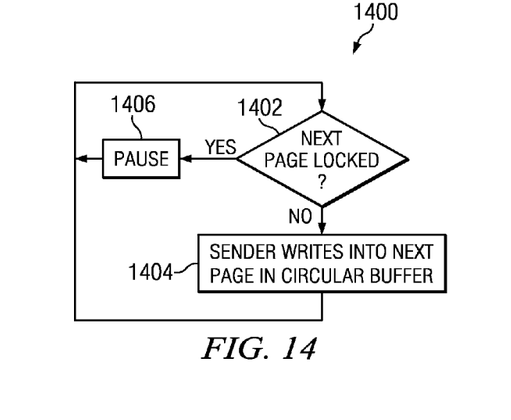
FIG. 14 is a flow diagram illustrating sender flow control, in accordance with the present disclosure.

FIG. 14 is a flow diagram illustrating a process 1400 for sender flow control. As discussed above, senders write into consecutive pages, treating the shared memory segment as a circular buffer. Should the sender discover that the next page is locked by one or more receivers at decision 1402 (that is, the bit array 1204 in the header 1206 of the next page 1202 from FIG. 12 includes one or more set bits), it may pause at action 1406 until the page is unlocked. When the next page is unlocked, the sender writes into the next page in the circular buffer at action 1404.

Referring back to FIG. 12, receivers begin reading at page 1202 and at an offset provided by the sender upon initial registration. When a receiver has read all of the bytes indicated as having been written (e.g., by the page header 1206's byte count 1208), the receiver decides whether to wait for the sender to write more to this page or to advance to the next page. This decision is guided by whether the global variable, e.g., global write page, has advanced to a subsequent page. If the global variable has advanced from the current page, the receiver will advance to the next page.

Figure 15:
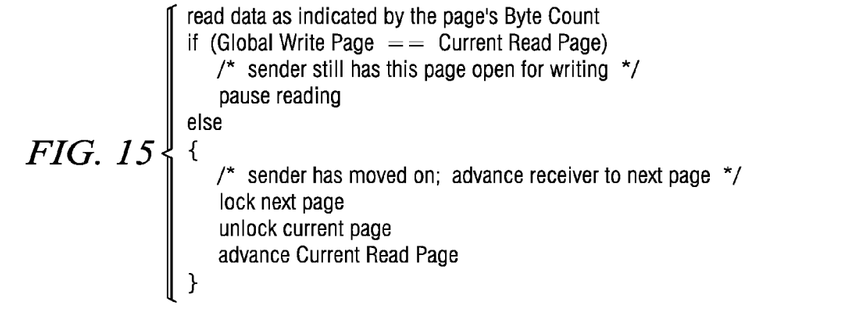
FIG. 15 is a schematic diagram of an exemplary routine for receiver reads, in accordance with the present disclosure.

FIG. 15 is a schematic diagram of an exemplary routine for receiver reads. Once the receiver has advanced to the next page, it continues reading as indicated by the byte count variable.

Should a receiver fail, its page locks should be cleared. When a receiver failure is detected by the sender, the sender may clean up the receiver's state by unlocking the receiver's current read page array and the following page. The locking protocol discussed above in FIG. 14 results in a receiver not locking more than two consecutive pages, whereby the first locked page is the page referenced by the receiver's current read page array.

In an embodiment, the bit arrays (e.g., 1204 in FIG. 12) are actually read and written as bytes or words, rather than as individual bits. With the sender and multiple receivers each writing to the bit arrays, writes use compare-and-swap to allow one of multiple contending writers to write at a given time. This prevents one writer from incorrectly setting or resetting another writer's bit value.

For example, for a bit array in which bits 1 and 3 are set to 10100000, if a first receiver (e.g., receiver1) and a third receiver (receiver3) each attempt to clear their bit, they may incorrectly set the bit of their competitor.

Figure 18:
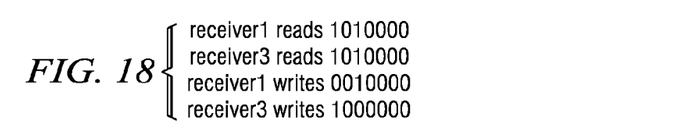
FIG. 18 is a schematic diagram of an example of a bit setting error, in accordance with the present disclosure.

FIG. 18 is a schematic diagram illustrating a bit setting error. Note that receiver3 incorrectly sets the bit for receiver1.

Receiver1 and receiver3 act in parallel. Both receivers may read 10100000 and both receivers would like to unlock the page by clearing their bit. Without compare-and-swap, receiver1 would want to change 10100000 into 00100000 and receiver3 would want to change 10100000 into 10000000. If receiver1 writes back to shared memory first and receiver3 writes second, the resulting value is 10000000. This value would be incorrect in that it signifies that receiver1 still has the page locked. With compare-and-swap, if receiver1 writes first and receiver3 writes second, receiver3 will state that it wants to change the contents of shared memory from 10100000 to 10000000 and will get a failure, since by then the content of the shared memory is 00100000 (after receiver1's change). At this point receiver3 will re-read, obtain 00100000, and will use compare-and-swap to change shared memory contents to 00100000.

Thus, when using a compare-and-swap, the third receiver's attempt would fail because it holds a stale value that fails the compare. In such a case, a receiver re-reads the value and reattempts the compare-and-swap to set or clear the appropriate bit.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A server for transporting data using shared memory, where in the server comprises:
    shared memory, wherein the shared memory is partitioned into one or more pages and a free list, the free list having a first free pointer pointing to a first free page of the free list and the free list being a circular buffer data structure;
    a plurality of sender applications comprising a first sender application and a second sender application, wherein:
        the first sender application and the second sender application are both operable to identify a same first free page from among the partitioned pages by reading the first free pointer from the free list;
        the first sender application and the second sender application are operable to compete to allocate the first free page;
        the first sender application is operable to allocate the first free page identified by the first sender application and the second sender application when the first sender application completes a compare and swap operation or similar atomic processor instruction before the second sender application, wherein the first sender application completes the compare and swap operation or similar atomic processor instruction before the second sender application when the first sender application sets the first free page to point to an allocated pages list of the first sender application;

the first sender application is operable to write data to the allocated page, wherein a page is either available for use or allocated to only one of the sender applications;

the allocated page becomes available for a receiver application to read data after the first sender application has completed writing the data;

the first sender application is operable to send a signal to the receiver application, wherein the signal notifies the receiver application that writing the data to the allocated page is complete; and the free list is accessible directly by the sender applications; and the receiver application, wherein the receiver application is operable to read the data from the allocated page and de-allocate the allocated page, wherein each of the pages available for use can be allocated to any one of the plurality of sender applications.

2. The server of claim 1, wherein the server is operable to receive one or more messages and write the one or more messages to the shared memory.

3. The server of claim 1, wherein the one or more pages are stored in a circular free list.

4. The server of claim 1, wherein the shared memory may be virtual memory.

5. The server of claim 1, wherein the sender applications are operable to:
check if there is space in a page most recently allocated;
if there is insufficient space, allocate a page from a list of available pages;
link the page into a page list at the sender application; and
write data to the page.

6. The server of claim 1, wherein the server is operable to allow only one of the sender applications to allocate a page.

7. The server of claim 1, wherein the server is operable to return the page to a list of available pages upon the completion of the receiver application reading the data from the page.

8. The server of claim 1, wherein the server is a message-oriented middleware server.

9. The server of claim 1, wherein the page comprises a header, wherein the header comprises a bit array having bits representing registered receivers and a count of bytes that have been written to the page.

10. A method for transporting data using shared memory, where in the method comprises:
identifying, by both a first sender application and a second sender application, a same first free page from among one or more pages partitioned in a shared memory by reading a first free pointer from a free list, wherein the first free pointer is a pointer to the first free page of the free list, and wherein the free list is a circular buffer data structure residing in the shared memory and accessible directly by the first and second sender applications;
competing, by the first sender application and the second sender application, for the allocation of the first free page;
allocating, by the first sender application, the first free page identified by the first sender application and the second sender application when the first sender application completes a compare and swap operation or similar atomic processor instruction before the second sender application, wherein the first sender application completes the compare and swap operation or similar atomic processor instruction before the second sender application when the first sender application sets the first free page to point to an allocated pages list of the first sender application, wherein the identified first free page is stored in a shared memory, wherein the shared memory is partitioned into one or more pages;

writing data, by the first sender application, to the allocated page, wherein a page is either available for use or allocated to only one of the sender applications, wherein the allocated page becomes available for a receiver application to read data after the first sender application has completed writing the data;

sending a signal, by the first sender application, to the receiver application, wherein the signal notifies the receiver application that writing the data to the allocated page is complete;

reading, by the receiver application, the data from the allocated page; and de-allocating, by the receiver application, the allocated page, wherein each of the pages available for use can be allocated to any one of the plurality of sender applications.

11. The method of claim 10, wherein the method further comprises receiving one or more messages and writing the one or more messages to the shared memory.

12. The method of claim 10, wherein the one or more pages are stored in a circular free list.

13. The method of claim 10, wherein the shared memory may be virtual memory.

14. The method of claim 10, wherein the method further comprises: checking if there is space in a page most recently allocated; if there is insufficient space, allocating a page from a list of available pages; linking the page into a page list at the sender application; and writing data to the page.

15. The method of claim 10, wherein the method further comprises allowing only one sender application to allocate a page.

16. The method of claim 10, wherein the method further comprises returning the page to a list of available pages upon the completion of the receiver application reading the data from the page.

17. The method of claim 10, wherein the receiver application and the sender application are located at a message-oriented middleware server.

18. The method of claim 10, wherein the page comprises a header, wherein the header comprises a bit array having bits representing registered receivers and a count of bytes that have been written to the page.

19. Logic for transporting data using shared memory, the logic being embodied in a non-transitory computer-readable medium and when executed operable to:
identify, by both a first sender application and a second sender application, a same first free page from among one or more pages partitioned in a shared memory by reading a first free pointer from a free list, wherein the first free pointer is a pointer to the first free page of the free list, and wherein the free list is a circular buffer data structure residing in the shared memory and accessible directly by the first and second sender applications;
compete, by the first sender application and the second sender application, for the allocation of the first free page;
allocate, by the first sender application, the first free page identified by the first sender application and the second sender application when the first sender application completes a compare and swap operation or similar atomic processor instruction before the second sender application, wherein the first sender application completes the compare and swap operation or similar atomic processor instruction before the second sender application when the first sender application sets the first free page to point to an allocated pages list of the first sender application, wherein the identified first free page is stored in a shared memory, wherein the shared memory is partitioned into one or more pages;

write data, by the first sender application, to the allocated page, wherein a page is either available for use or allocated to only one of the sender applications, wherein the allocated page becomes available for a receiver application to read data after the first sender application has completed writing the data;

send a signal, by the first sender application, to the receiver application, wherein the signal notifies the receiver application that writing the data to the allocated page is complete;

read, by the receiver application, the data from the allocated page; and de-allocate, by the receiver application, the allocated page, wherein each of the pages available for use can be allocated to any one of the plurality of sender applications.

20. The logic of claim 19, wherein the logic when executed is further operable to receive one or more messages and write the one or more messages to the shared memory.

21. A server for transporting data comprising:

a first sender application and a second sender application;

one or more receiver applications; and shared memory partitioned into one or more pages and a free list, the free list comprising of one or more free pages having a first free pointer pointing to a first free page of the one or more free pages, wherein the free list is a circular buffer data structure and accessible by the first and second sender applications, wherein each free page is available to any one of the sender applications;

wherein each sender application is operable to send data to one or more of the receiver applications by:

identifying, by both the first sender application and the second sender application, a same first free page from among the one or more free pages by reading the first free pointer from the free list;

performing, by the first sender application before the second sender application, a compare and swap operation or similar atomic processor instruction, wherein the first sender application completes the compare and swap operation or similar atomic processor instruction before the second sender application when the first sender application sets the first free page to point to an allocated pages list of the first sender application;

writing data to the first free page; and notifying the one or more receiver applications when the writing is complete; and wherein each notified receiver application is operable to read the data of the one or more written pages and return the one or more read pages to the free list.

22. A server for transporting data comprising:

a first sender application and a second sender application;

one or more receiver applications; and shared memory partitioned into one or more pages and a free list, the free list comprising of one or more free pages having a first free pointer pointing to a first free page of the one or more free pages, wherein the free list is a circular buffer data structure and accessible by the first and second sender applications, wherein each free page is available to any one of the sender applications;

wherein each sender application is operable to send data to one or more of the receiver applications by:

identifying, by both the first sender application and the second sender application, a same first free page from among the one or more free pages by reading the first free pointer from the free list;

performing, by the first sender application before the second sender application, a compare and swap operation or similar atomic processor instruction, wherein the first sender application complete the compare and swap operation or similar atomic processor instruction before the second sender application when the first sender application sets the first free page to point to an allocated pages list of the first sender application;

writing data to first free page; and notifying the one or more receiver applications when the writing is complete; and wherein each notified receiver application is operable to return the one or more written pages to the free list when a data transport fault occurs.

* * * * *